Figure 1:
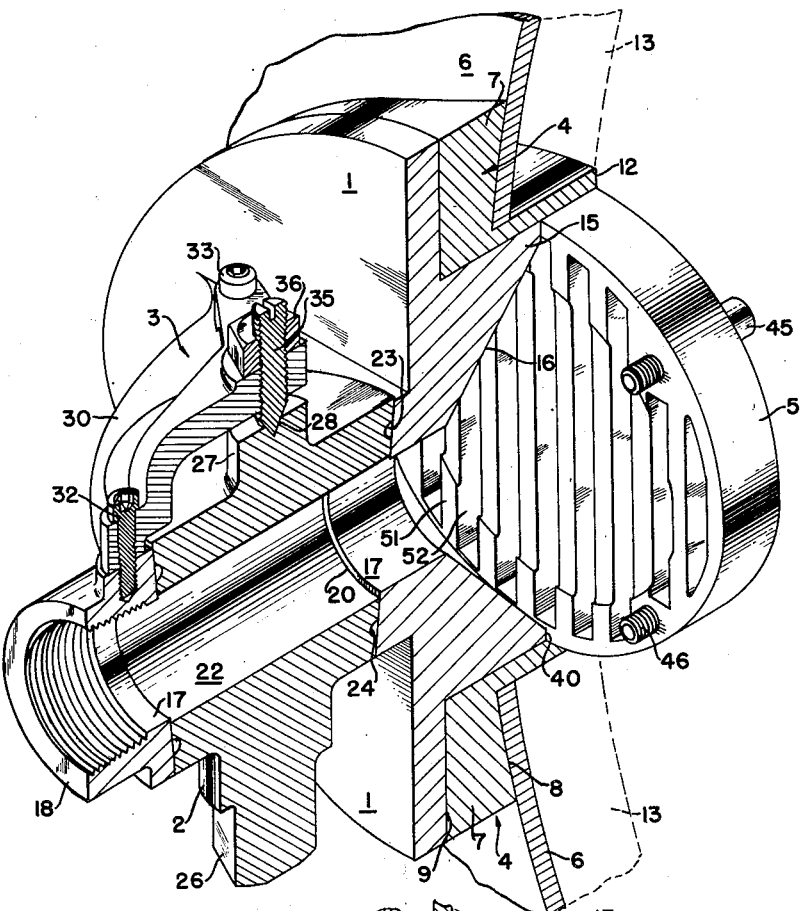

Sept. 17, 1957   R. L. CAWOOD   2,806,602
PLUG VALVE AND PLUG VALVE COMBINATION
Filed July 26, 1954

INVENTOR
RICHARD LAWRENCE CAWOOD
BY
Pennie, Edmonds, Morton, Barrows & Taylor
ATTORNEYS

United States Patent Office 2,806,602
Patented Sept. 17, 1957

2,806,602

PLUG VALVE AND PLUG VALVE COMBINATION

Richard Lawrence Cawood, East Liverpool, Ohio, assignor to The Patterson Foundry & Machine Co., East Liverpool, Ohio, a corporation of Ohio Application July 26, 1954, Serial No. 445,543

2 Claims. (Cl. 210—172)

This invention relates to plug type outlet valves for process vessels, and has for its object the provision of an improved plug valve for controlling the discharge opening or port of various process vessels, such as pebble and ball mills for grinding solids in liquids, such as colors in oils. It is also adaptable to use as an outlet valve on such process vessels as kettles, storage tanks, and the like where free-flowing fluids are processed or stored.

One of the important features of the plug valve of my invention is that the opening through the plug is at least as large in diameter as the opening or discharge passageway through the valve body, thereby providing a free and relatively large cross-sectional area through the plug which facilitates unloading the vessel. The valve also includes removable means on the valve body to vary the pressure on the plug and consequently its tightness or looseness and which also facilitates its removal for cleaning and adjustment.

In its more complete embodiment the invention provides a plug valve in combination with attachment means for the vessel and a grid overlying the valve passageway on the inside. In a preferred combination of the invention, I provide a connecting member which has a flange for connecting both the valve body and the process vessel together and which has an opening leading from the vessel to the passageway. The flanged connecting member is securely connected to the vessel, preferably has an annular collar extending into the vessel, and the valve body has an annular extension or neck which fits inside the collar and provides a base against which the grid, also mounted within the collar, makes abutting contact. In the case of vessels lined with refractory material, such as glass, porcelain or plastics, the collar provides a supporting edge against which the lining makes flush contact.

The grid has a plurality of openings and is preferably provided with strong ribs or bars which prevent the pebbles, balls, rods, or other moving or movable bodies within the vessel from contacting and injuring the valve. The openings through the grid lead directly into a conical throat within the annular neck of the valve body. It is an important feature of the invention that when the plug is turned to the open position there is a straight line opening through the plug, the throat, and the grid into the vessel for the direct flow of material.

The improved plug valve and associated elements in combination therewith are few in number, of simple and sturdy construction, are easy to assemble and dissemble for cleaning and repairs and greatly facilitate the discharging of processed materials from the vessel.

Figure 2:
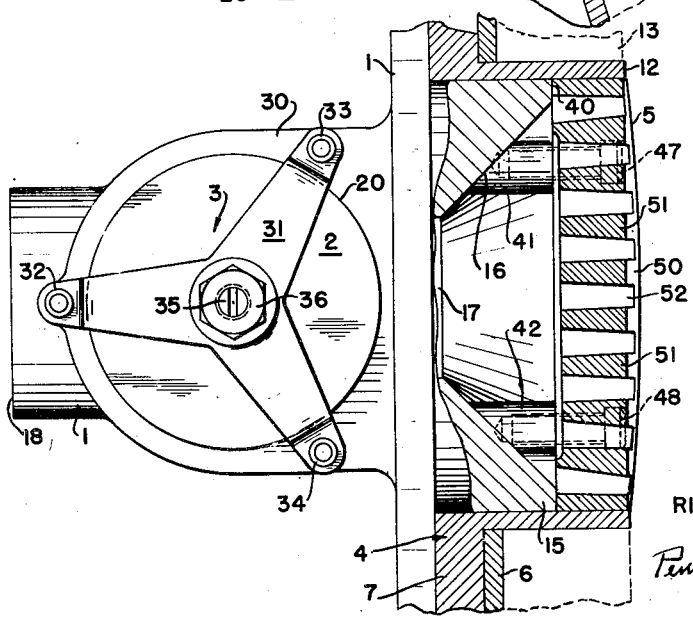

These and other objects of the invention will be better understood after considering the following discussion taken in conjunction with the accompanying drawings, in which:

Fig. 1 is a perspective, with parts in section, of a plug valve and plug valve combination of the invention, and Fig. 2 is a plan view, with parts in section, of the plug valve combination of Fig. 1.

The plug valve and combination illustrated in the drawings comprises a valve body 1, a plug 2, a plug adjusting means 3, a connecting member 4, and a grid 5. The process vessel 6 may have various shapes, such as spherical or cylindrical, and the connecting member 4 has a flange 7 with a curved surface 8 (for a flat vessel this surface 8 would also be flat) for engaging the process vessel to which it may be permanently connected, as by welding, and a flat surface 9 to which the valve body 1 is connected also more or less permanently as by bolts (not shown). The integral annular collar 12 of the connecting member extends into the process vessel sufficiently to be flush with lining 13 which may be of glass, procelain, refractory material, or the like.

The valve body has a neck 15 which extends into the collar and the conically shaped throat 16 thereof connects with the passage 17 which extends through the valve body to the threaded end 18. The valve body has a tapered bore 20 in which the tapered plug 2 is mounted. The plug has a hole 22 which is at least as large, preferably larger, in diameter as the passageway 17 in the valve body. As shown in Fig. 1, the plug has annular grooves 23 and 24 which can be connected to grease fittings (not shown) and supplied with lubricant from an outside source by any suitable means such as a pressure grease gun. The grease grooves may be omitted and the plug may be coated with a resin, for example with a thin coating around 0.008 inch thick of Teflon or other plastic material. This resin or other coating has the property to prevent sticking, and prevents material such as paint or other products from adhering to either the plug or the valve body. The projecting end 26 has an hexagonal shape to receive a handle or wrench for turning the plug and the projecting end 27 has a conical recess 28. Any suitable stop means such as a pin and stop may be provided to limit the turning of the plug, so that it is either entirely closed or entirely open.

The valve body has a flat area 30 surrounding the large end of the plug with tapped holes in a triangular arrangement for receiving the triangular bracket 31 which is bolted to the valve body by the Allen cap screws 32, 33 and 34. The central hub of the bracket is threaded to receive the adjusting screw 35 which has a conical end bearing in the conical recess 28. The adjusting screw can be set to apply any desired pressure on the plug and is secured in position by the lock nut 36. The plug may be removed easily for cleaning simply by removing the bolts 32, 33 and 34 and the bracket 31.

The neck 15 has a flat shoulder 40 against which the grid 5 makes abutting contact. The neck 4 has equally spaced bosses, only 41 and 42 are shown, which are tapped to receive the cap screws 45, 46, 47 and 48 which secure the grid in removable position The grid may be made of cast steel or other suitable metal and may have an inner surface 50 which conforms to the inner surface of the process vessel or it may be slightly convexed as shown to deflect impinging pebbles or balls. The grid bars 51 and spaces 52 are proportioned in accordance with the character of the material being processed. Where balls or other grinding elements are used, the bars must be strong enough to stand the normal use, and the spaces large enough to permit free flow of the material when the valve is opened.

I claim:

1. The combination of a plug valve with a processing vessel which comprises a valve body having a neck extending in the direction of the processing vessel, said neck having a tapered throat and an annular bearing surface at one end of the throat, means connecting the neck of the valve body to the processing vessel, said connecting means comprising a member surrounding said neck and having a flange extending through an opening in the wall of the vessel and inwardly beyond said annular bearing surface at said end of the valve throat, a grid positioned within the inner end of said flange, opposite said throat and in bearing contact with said annular bearing surface, a passageway through the valve body in axial alignment with the throat and contiguous therewith, a tapered bore through the valve body transverse to the passageway, a plug in the tapered bore having a hole therethrough which is at least as large in cross-sectional area as the passageway and having the same cross-sectional shape, and means for adjusting the pressure on the plug to vary its tightness or looseness.

2. The combination of a plug valve with a processing vessel which comprises a valve body having a neck extending in the direction of the processing vessel, said neck having a tapered throat and an annular bearing surface at one end of the throat, means connecting the neck of the valve body to the processing vessel, a circular grid overlying the throat and in bearing contact with said annular bearing surface, a passageway through the valve body in axial alignment with the throat and contiguous therewith, a tapered bore through the valve body transverse to the passageway, a plug in the tapered bore having a hole therethrough which is at least as large in cross-sectional area as the passageway and having the same cross-sectional shape, and means for adjusting the pressure on the plug to vary its tightness or looseness.

References Cited in the file of this patent

UNITED STATES PATENTS

| | | |
|---|---|---|
| 607,238 | Heston | July 12, 1898 |
| 831,139 | Bonner | Sept. 18, 1906 |
| 1,222,972 | Monfee | Apr. 17, 1917 |
| 1,561,867 | Larsen | Nov. 17, 1925 |
| 1,652,929 | Cawood | Dec. 13, 1927 |
| 1,800,554 | McKee | Apr. 14, 1931 |
| 1,839,092 | Feldmeier | Dec. 29, 1931 |
| 1,845,736 | Anderson | Feb. 16, 1932 |
| 2,088,410 | Everson | July 27, 1937 |
| 2,432,172 | Reed | Dec. 9, 1947 |